United States Patent [19]

Sakamoto et al.

[11] Patent Number: 5,118,072

[45] Date of Patent: Jun. 2, 1992

[54] SOLENOID VALVE

[75] Inventors: Jyunichi Sakamoto; Tetsuya Onkura; Tsukasa Harada, all of Kadoma, Japan

[73] Assignee: Matsushita Electric Works, Ltd., Osaka, Japan

[21] Appl. No.: 608,476

[22] Filed: Nov. 2, 1990

[30] Foreign Application Priority Data

Nov. 27, 1989 [JP] Japan .................. 1-307106

[51] Int. Cl.⁵ .......................... F16K 31/126
[52] U.S. Cl. .................. 251/30.02; 251/129.17
[58] Field of Search ........... 251/30.01, 30.03, 30.04, 251/65, 30.02, 129.17, 45

[56] References Cited

U.S. PATENT DOCUMENTS

| | | | |
|---|---|---|---|
| 2,659,197 | 11/1953 | Halford et al. | 251/30.04 X |
| 3,424,427 | 1/1969 | Ruchser | 251/30.04 X |
| 4,081,171 | 3/1978 | Morgan et al. | |
| 4,717,116 | 1/1988 | Ishigaki | 251/30.02 |
| 4,816,083 | 3/1989 | Bangyan | 251/30.02 X |

FOREIGN PATENT DOCUMENTS

| | | |
|---|---|---|
| 0245577 | 11/1987 | European Pat. Off. |
| 2544834 | 10/1984 | France ....................... 251/65 |
| 0316586 | 12/1989 | Japan ....................... 251/30.01 |

Primary Examiner—Martin P. Schwadron
Assistant Examiner—Kevin L. Lee
Attorney, Agent, or Firm—Burns, Doane, Swecker & Mathis

[57] ABSTRACT

A solenoid valve is formed with a first pressure chamber defined to be above a valve seat with and from which a valve member engages and disengages and to communicate with a fluid supply side within a valve housing, and solenoid means mounted to the valve housing with a pilot valve interposed between them while defining a pilot chamber below the pilot valve and a second pressure chamber above the pilot valve, the pilot chamber communicating with the first pressure chamber and with a fluid discharge side of the valve member. The pilot valve actuated by the solenoid means for a relatively smaller displacement allows the main valve member to be actuated to open and close the valve, whereby the solenoid means and eventually the entire valve can be minimized in size, and any impurity contained in flowing fluid can be prevented from adhering to a movable member in the solenoid means for assuring a highly reliable operation of the valve for a long term.

10 Claims, 7 Drawing Sheets

SOLENOID VALVE

BACKGROUND OF THE INVENTION

This invention relates generally to solenoid valves and, more particularly, to a pilot type solenoid valve for opening and closing a fluid pipe way.

The solenoid valve of the kind referred to can be effectively utilized in turning on and off supplied water in showering device and so on.

DESCRIPTION OF RELATED ART

As has been disclosed in, for example, U.S. Pat. No. 4,081,171 of Norman D. Morgan et al., known solenoid valve has a valve seat formed in a valve housing so as to define on both sides of the seat a fluid supply side and a fluid discharge side, a main valve member made integral with a diaphragm is disposed within the housing for an engagement with and disengagement from the valve seat, and a pressure chamber is defined within the housing to be above the main valve member, while this pressure chamber is made to communicate, through an orifice made through the main valve member, with the fluid supply side and, through a pilot passage also penetrating through the main valve member, with the water discharge side. Further, a solenoid means is mounted onto the valve housing to be positioned above the pressure chamber, and a pilot valve is mounted to a plunger of the solenoid means for opening and closing a pilot path, while a spring force of a resetting spring is applied to the plunger carrying the pilot valve.

Accordingly, the pilot valve is made to close the pilot path as biased by the spring force of the resetting spring when the solenoid means is in non-excited state, whereas the pilot valve is to open the pilot path with the plunger displaced in a direction separating from the pilot path against the biasing force of the resetting spring when the solenoid means is in excited state.

With the pilot valve actuated to close the pilot path by the biasing force of the resetting spring, the pressure chamber is made to be at the same pressure as the fluid supply side through the orifice of the main valve member, and the pilot valve can be reliably held in the closing state of the pilot path into which state an elasticity of the diaphragm is also acting. When, on the other hand, the pilot valve is actuated to open the pilot path with the solenoid excited, a fluid in the pressure chamber flow through the pilot path to the discharge side, the pressure in the pressure chamber is thereby caused to decrease, the main valve member is separated from the valve seat under the fluid pressure on the supply side, and the valve is put in an open state.

In this valve open state, a main stream of the fluid attained from the supply side to the discharge side is to flow through lower side of the main valve member in the open state, but part of the fluid takes a path of flowing from the orifice, through a zone adjacent the plunger and the pilot path, to the discharge side. Accordingly, the zone adjacent the plunger is always exposed to the flowing fluid, so that there will arise a problem that such impurity contained in the fluid as iron, calcium and the like components will accumulatively adhere to guide pipe or the like disposed adjacent the plunger and a smooth displacement of the plunger cannot be maintained.

In the known valve of the foregoing arrangement, further, the provision of the pilot path in the main valve member makes it necessary to arrange operating stroke of the plunger in correspondence with operating stroke of the main valve member, so that there arises another problem that a larger solenoid is called for and the entire body of the solenoid valve has to be enlarged.

SUMMARY OF THE INVENTION

Is is a main object of the present invention, therefore, to eliminate such problems as in the above, and to provide a solenoid valve which effectively prevents any impurities from accumulatively adhering to a portion adjacent the plunger in the solenoid and is thus highly reliable in the operation.

It is another object of the present invention to provide a solenoid valve which is capable of restraining the operating stroke of the plunger to be the minimum and thus to minimize in size the solenoid and eventually the entire body of the solenoid valve.

Other objects and advantages of the present invention shall be made clear in the following description of the invention detailed with reference to preferred embodiments shown in accompanying drawings.

Figure 1:
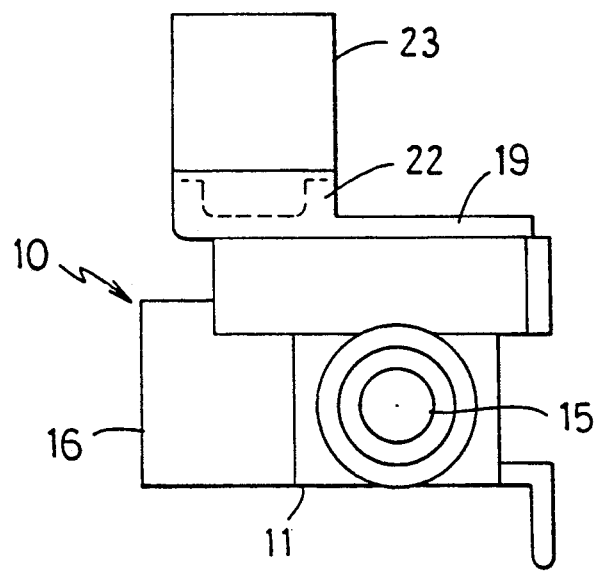
FIG. 1 is a side view in an embodiment of the solenoid valve according to the present invention.

While the description of the invention is made with reference to the embodiments shown in the drawings, it should be appreciated that the intention is not to limit the invention only to these embodiments shown but rather to cover all modifications, alterations and equivalent arrangements possible within the scope of appended claims.

DETAILED DESCRIPTION OF THE PREFERRED EMBODIMENTS

Figure 2:
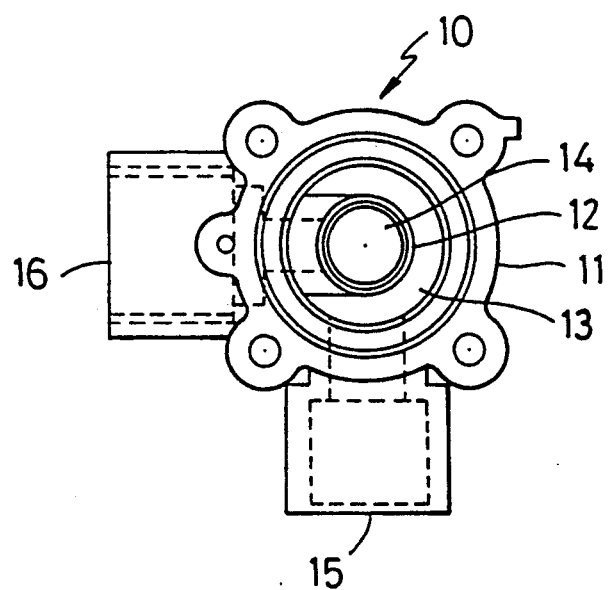
FIG. 2 is a plan view of the solenoid valve of FIG. 1.
Figure 3:
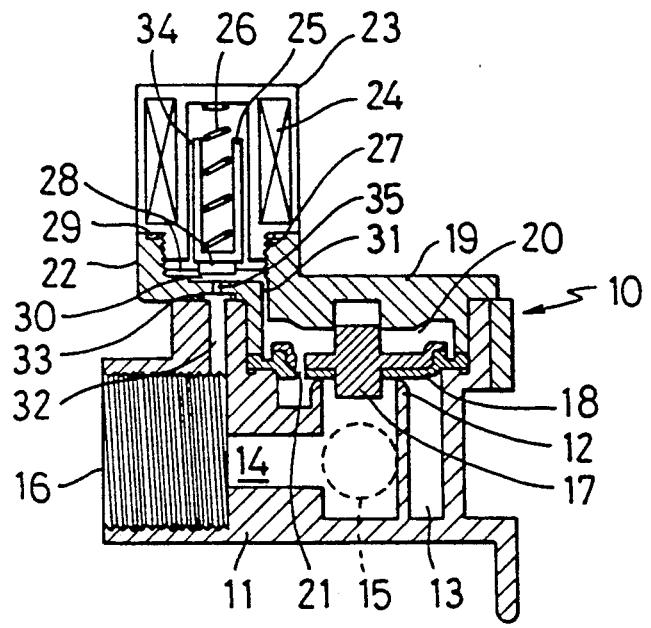
FIG. 3 is a schematic sectioned view of the solenoid valve shown in FIG. 1.

Referring to FIGS. 1–3, there is shown a solenoid valve 10 in an embodiment according to the present invention, which solenoid valve 10 comprises a valve housing 11 including therein a valve seat 12 and fluid supply and discharge sides or passages 13 and 14 defined on both sides of the valve seat 12, a fluid inlet port 15 connected to the fluid supply side 13 and a fluid discharge port 16 connected to the fluid discharge side 14. In the housing 11, further, a main valve member 17 is disposed to be engageable with and disengageable from the valve seat 12, and an elastic diaphragm 18 is provided integral with the main valve member 17 preferably by means of bonding along peripheral part of them. These main valve member 17 and diaphragm 18 made integral with each other are disposed so that a fluid pressure in the supply side 13 will be applied to the peripheral part, while a fluid pressure in the discharge side 14 will be applied to a central part of them.

A lid 19 forming part of the valve housing 11 is fitted above the main valve member 17 to define a first pressure chamber 20 above the member 17, and this first pressure chamber 20 is made to communicate with the fluid supply side 13 through an orifice path 21 made to penetrate through the main valve member 17 and diaphragm 18. On one side of the lid 19, a mounting part 22 is provided to project thereout, and a solenoid 23 is mounted onto this mounting part 22. This solenoid 23 comprises a coil 24, plunger 25 consisting of a rod-shaped piston and resetting spring 26 for the plunger, and its mounting to the mounting part 22 is carried out in liquid tight manner by screwing a threaded bottom end of solenoid housing into a threaded port 27 of the mounting part 22, with a diaphragm pilot valve 28 interposed centrally and an annular packing 29 interposed peripherally around the port 27.

In this case, a pilot chamber 30 is defined below the solenoid 23 by means of the diaphragm pilot valve 28, and this pilot chamber 30 is made to communicate, through a path 31 penetrating through the lid 19, with the first pressure chamber 20 and, through a path 32 made in the valve housing 11 and a packing 33 interposed between the housing 11 and the mounting part 22 for liquid tightness, with the fluid discharge side 14. Further, inside the solenoid 23, a second pressure chamber 34 is defined peripherally about the plunger 25 and above the diaphragm pilot valve 28, while this pilot valve 28 itself is joined to the plunger 25 for cooperation therewith so as to engage with and disengage from a pilot valve seat 35 disposed between the pilot chamber 30 and the path 32.

The operation of the foregoing solenoid valve 10 shall be referred to next. Now, in a normal state of the plunger 25 urged downward by the biasing force of the resetting spring 26 and, consequently, the diaphragm pilot valve 28 engages with the pilot valve seat 35, the first pressure chamber 20 communicates through the orifice path 21 with the fluid supply side 13 to have the same fluid pressure therewith, and the main valve member 17 is made to engage with the valve seat 12 under the elasticity of the diaphragm 18. That is, the solenoid valve 10 is in its closed state. Upon excitation of the coil 24 of the solenoid 23, the plunger 25 as well as the diaphragm pilot valve 28 are driven upward to be separated from the seat 35, the pilot valve comes in its open state to have a fluid pressure in the discharge side 14 applied to the first pressure chamber 20 through the path 32, valve seat 35, pilot chamber 30 and path 31, whereby the pressure in the first pressure chamber 20 is made lower than that in the supply side 13, the main valve member 17 is caused to disengage from the seat 12 by the pressure in the supply side 13 now higher, the main valve member 17 thus comes to its open state so that the fluid supply and discharge sides 13 and 14 are in direct communication with each other. That is, the solenoid valve 10 is in its open state.

In the foregoing open state of the solenoid valve 10, a direct fluid flow from the supply side 13 to the discharge side 14 is the main stream, whereas a partial stream of fluid is made to flow also from the supply side 13 to the discharge side 14 but through the orifice path 21, pilot chamber 30, pilot valve seat 35 and path 32. In this case, the diaphragm pilot valve 28 between the pilot chamber 30 and the second pressure chamber 34 defined inside the solenoid 23 is disposed liquid tight, so that any fluid from the supply side 13 to the discharge side 14 can be prevented from entering into the space peripherally about the plunger 25. Therefore, it is possible to prevent any impurity in the fluid from accumulatively adhering to the plunger 25 in the solenoid 23 and its neighboring parts, the operation of the plunger 25 and eventually the opening and closing operation of the solenoid valve 10 can be well assured for a long term, and the durability of the valve 10 can be remarkably improved. In addition, the pilot chamber 30 is remarkably smaller in the depth than that of the first pressure chamber 20, the pilot valve 28 can be made to be of a remarkably smaller operating stroke, and the plunger 25 and eventually the entire solenoid 23 for actuating the pilot valve 28 can be sufficiently minimized in size, as will be readily appreciated.

Figure 4:
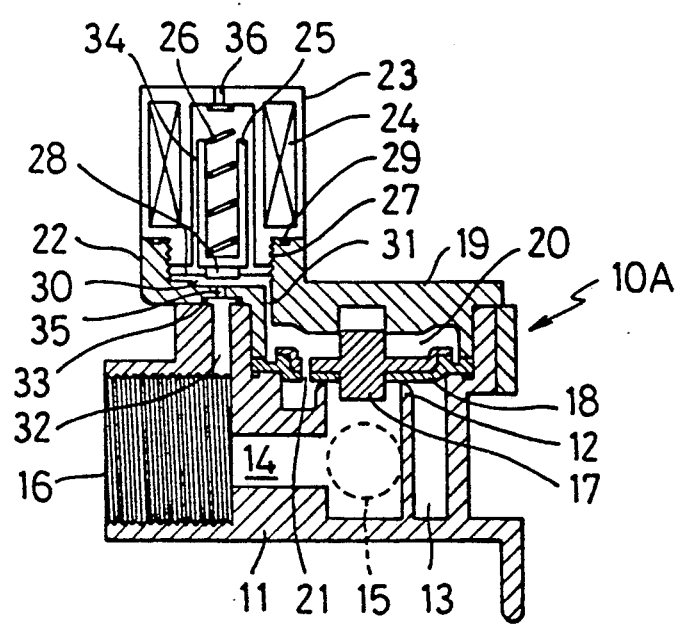
FIGS. 4 through 6 are schematic sectioned views in other embodiments of the solenoid valve according to the present invention.

Referring next to FIG. 4, there is shown another embodiment of the solenoid valve according to the present invention, in which embodiment the solenoid valve 10A is provided with an intake path 36 made in the top portion of the solenoid 23 for communicating the second pressure chamber 34 with the atmosphere. With this arrangement, the second pressure chamber 34 is maintained at the atmosphere level, with the atmosphere always led into the chamber through the path 36, a backpressure acting on the diaphragm pilot valve 28 is made constant, and a force required for displacing the plunger 25 with respect to the pilot valve seat 35 can be made smaller. Accordingly, the entire size of the solenoid 23 can be further minimized. In this embodiment of FIG. 4, other constituents and their function are the same as those in the embodiment of FIGS. 1-3, and the same reference numerals as those in FIGS. 1-3 are likewise used in FIG. 4 for the same constituents.

Figure 5A:
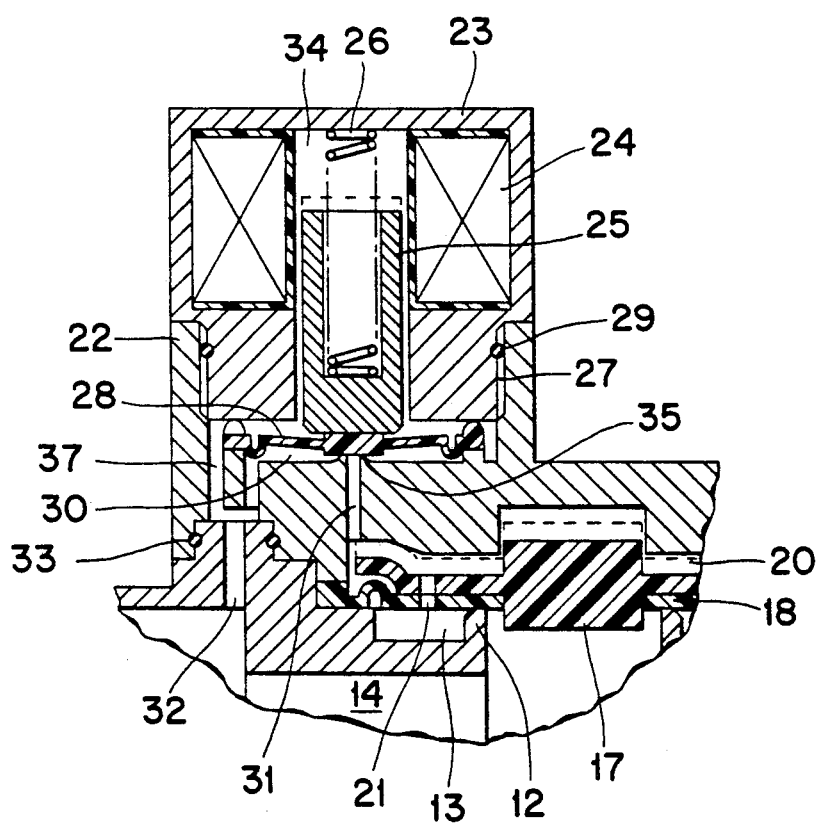
FIG. 5A is a more detailed view of FIG. 5 depicting the diaphragm valve in greater detail.
Figure 5:
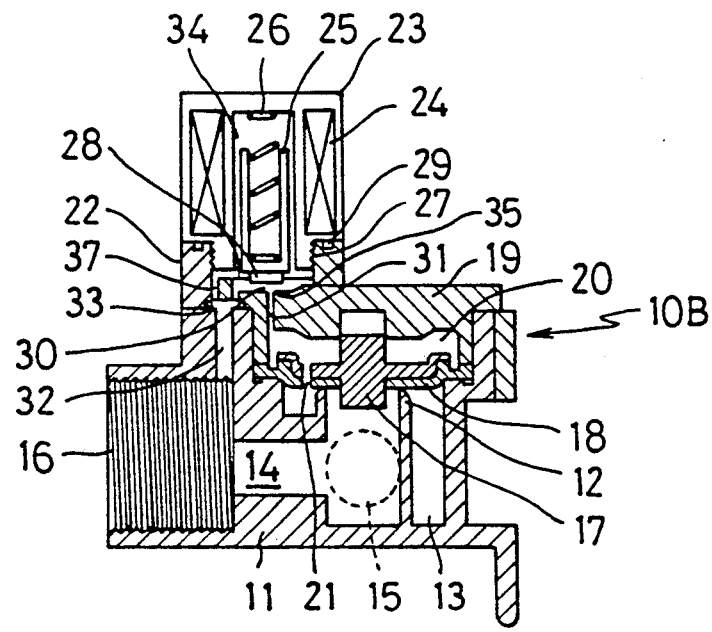

Referring to FIG. 5, there is shown a further embodiment of the solenoid valve 10B according to the present invention, in which the path 32 communicating the pilot chamber 30 with the discharge side 14 is made to communicate, through a further pressure leading path 37, with the second pressure chamber 34, and the pilot valve seat 35 is made to be engaged and disengaged by the diaphragm pilot valve 28 on the side of the path 31 communicating the first pressure chamber 20 with the pilot chamber 30. According to this arrangement, the same pressure is achieved in the pilot chamber 30 and the second pressure chamber 34 on both sides of the diaphragm pilot valve 28, so that this valve 28 can be freed from any additional load, the required force for driving the pilot valve 28 and plunger 25 can be minimized, and the arrangement can be sufficiently contributive to the minimization in size of the solenoid. In the present instance, further, the fluid from the supply side 13 to the discharge side 14 is partly caused to enter into the second pressure chamber 34, but such partly entering fluid is limited to be of a slight amount corresponding to a relatively small displacement of the diaphragm pilot valve 28, and the adhering of any impurity to the plunger 25 and its neighboring members is out of question. In the present instance, too, other constituents and their function are the same as those in the embodiment of FIGS. 1-3, and the same reference numerals as those in FIGS. 1-3 are likewise used in FIG. 5 for the same constituents.

Figure 6:
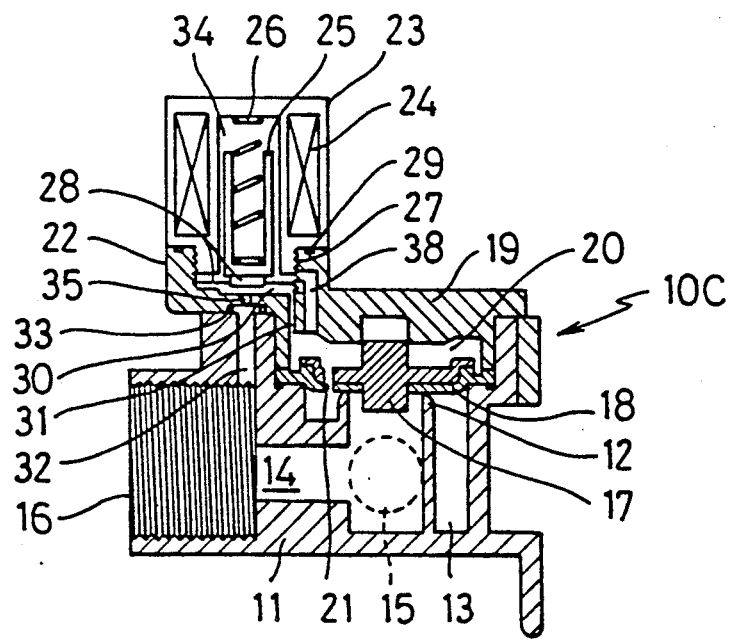

Referring to FIG. 6, there is shown another embodiment of the solenoid valve 10C according to the present invention, in which the second pressure chamber 34 is made to communicate with the first pressure chamber 20 through a pressure leading path 38. With this arrangement, the same pressure is attained at the first and second pressure chambers 20 and 34, so that no additional load is applicable to the pilot valve 28, the required force for driving the pilot valve 28 and plunger 25 can be made smaller similarly to the embodiment of FIG. 5, and the solenoid can be sufficiently minimized in size. In the present instance, too, the fluid from the supply side 13 to the discharge side 14 is partly caused to enter into the second pressure chamber 34, but this partially entering fluid is limited to be of a slight amount corresponding to the relatively small displacement of the diaphragm pilot valve 28, and the adhering of impurity to the plunger 25 and its neighboring members is also out of question. In the present instance, other constituents and their function are the same as those in the embodiment of FIGS. 1-3, and the same reference numerals as in FIGS. 1-3 are likewise used in FIG. 6 for the same constituents.

Figure 7:
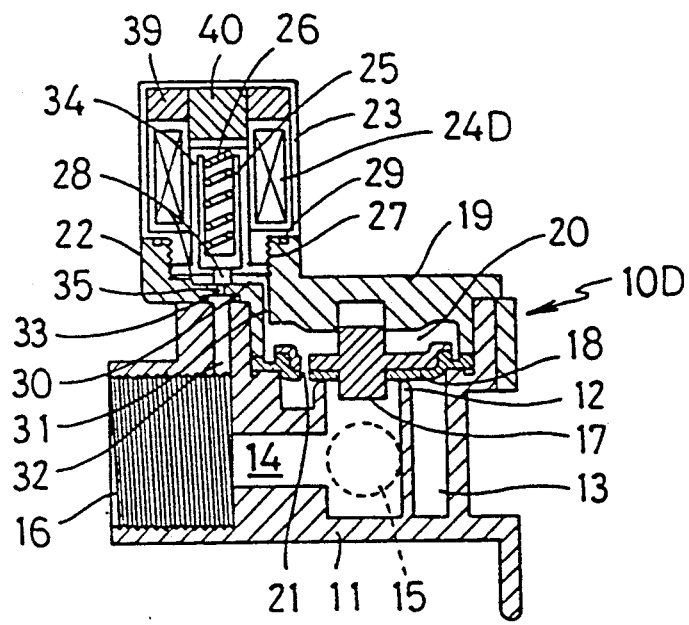
FIGS. 7 through 9 are schematic sectioned views in further embodiments of the solenoid valve employing a self-maintaining type solenoid in the solenoid valve according to the present invention.

According to another feature of the present invention, the solenoid is formed in a self-maintaining type. That is, as shown in FIG. 7, the solenoid valve 10D in this embodiment comprises a permanent magnet 39 and a core 40 disposed above the resetting spring 26 to be magnetized by the magnet 39. When a current is fed to the coil 24D of the solenoid 23 in a direction of separating the plunger 25 from the pilot valve seat 35, the plunger 25 is moved upward in the drawing and is then attracted at its upper end by the magnetized core 40, the plunger 25 is thus maintained at its position separated from the pilot valve seat 35 against the biasing force of the resetting spring 26, and the diaphragm pilot valve 28 joined to the plunger 25 is maintained in the open state. When, on the other hand, a current in a direction of cancelling the attractive force of the core 40 is supplied to the coil 24D of the solenoid 23, the plunger 25 is caused to be displaced toward the pilot valve seat 35 by the biasing force of the resetting spring 26, and the diaphragm pilot valve 28 is placed in the closed state. Therefore, the solenoid is to self-maintain either the opened or closed state with the attraction of the core 40 or the biasing force of the resetting spring 26 even when the current supply to the coil 24D of the solenoid 23 is turned off, so long as the diaphragm pilot valve 28 is either in the opened or closed state. In the present instance, other constituents and their function are the same as those in the embodiment of FIGS. 1-3, and the same reference numerals as those in FIGS. 1-3 are likewise used in FIG. 7 for the same constituents.

Figure 8:
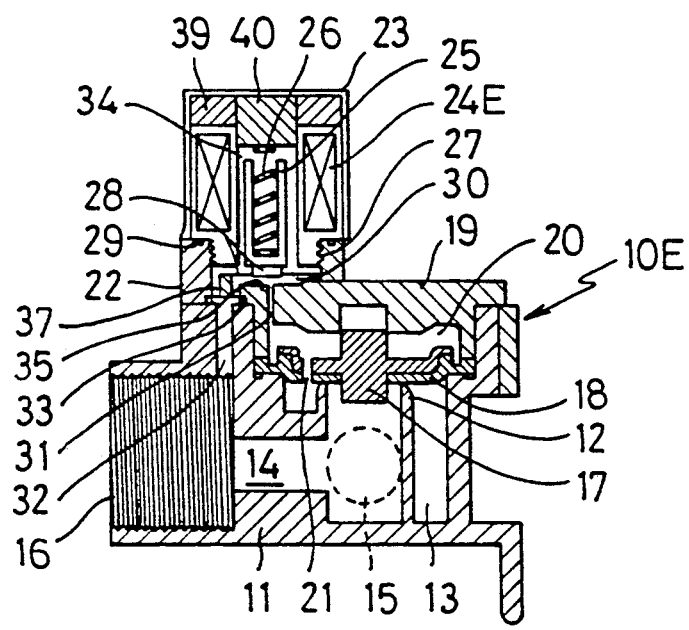

In another embodiment of the present invention as shown in FIG. 8, the permanent magnet 39 and thereby magnetized core 40 are incorporated in the foregoing embodiment of FIG. 5 to form the solenoid valve 10E. In the present instance, similarly to the embodiment of FIG. 5, the second pressure chamber 34 is made to communicate with the discharge side 14 through the pressure leading path 37 so that the same fluid pressure will be achieved at both of the second pressure chamber 34 and pilot chamber 30, required driving force for the pilot valve 28 and plunger 25 can be made smaller, and the solenoid 23 and eventually the solenoid valve 10E can be minimized in size. Similarly to the case of FIG. 7, the plunger 25 is driven in response to the direction of the current supplied to the coil 24E in the solenoid 23, and either the opened or closed state of the solenoid is to be self-maintained by means of the attraction of the core 40 or the biasing force of the resetting spring 26. In the present embodiment, other constituents and their function are the same as those in the respective embodiments of FIGS. 1-3, 5 and 7, and the same reference numerals as those in these embodiments are likewise employed in FIG. 8 for the same constituents.

Figure 9:
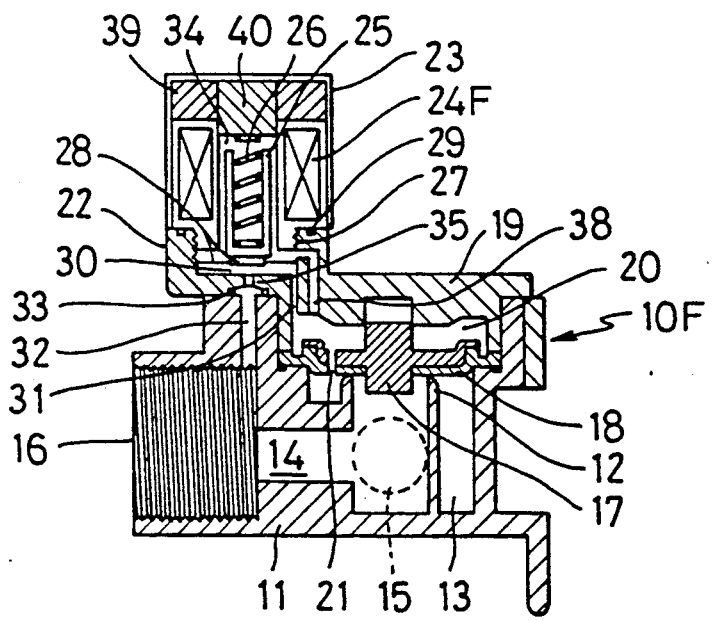

In a further embodiment of the present invention as shown in FIG. 9, the solenoid valve 10F is formed by incorporating the permanent magnet 39 and thereby magnetized core 40 in the embodiment of FIG. 6. In the present instance, similarly to the case of FIG. 6, the second pressure chamber 34 is made to communicate through the pressure leading path 38 with the first pressure chamber 20 which communicate with the fluid supply side 13, and the same pressure is made achievable at both of the second pressure chamber 34 and the pilot chamber 30 communicating with the first pressure chamber 20, whereby the required driving force for the pilot valve 28 and plunger 25 can be made smaller enough for minimizing in size the solenoid 23 and eventually the solenoid valve 10E. Also in the same manner as in the embodiment of FIG. 7, it is possible to drive the plunger 25 in response to the direction of the current supplied, so as to allow either the opened state or closed state of the solenoid to be self-maintained by means of the attraction of the core 40 or the biasing force of the resetting spring 26. In the present embodiment, other constituents and their function are the same as those in the respective embodiments of FIGS. 1-3, 6 and 7, and the same reference numerals as those in these embodiments are likewise employed in FIG. 9 for the same constituents.

Figure 10:
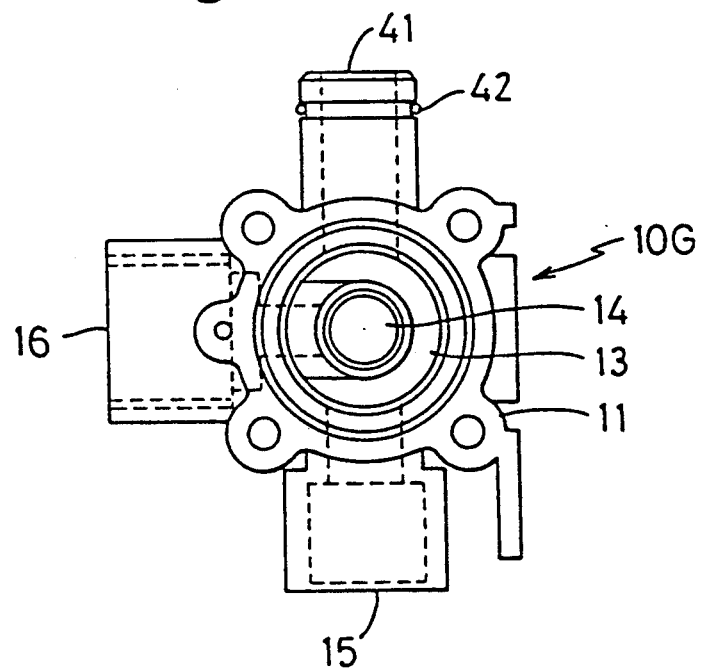
FIG. 10 shows in a plan view another embodiment of the solenoid valve provided with a water supply side outlet according to the present invention.
Figure 11:
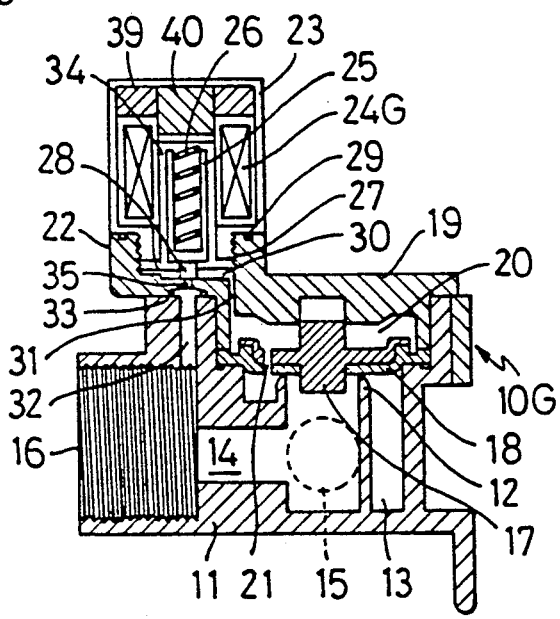
FIG. 11 is a schematic sectioned view of the solenoid valve of FIG. 10.

Referring to FIGS. 10 and 11 showing another embodiment of the solenoid valve 10G according to the present invention, this valve 10G is provided on the fluid supply side 13 but at a position opposite to the fluid inlet port 15 with a supplied fluid outlet 41 communicating directly with the inlet port 15 internally, while other constituents of the solenoid vale 10G are substantially the same as those in the self-maintaining type solenoid valve 10D of FIG. 7. An O-ring 42 is mounted around the outlet 41, for liquid tight connection to another solenoid valve at its inlet port 15. It will be appreciated that, with this arrangement, a plurality of the solenoid valves 10G can be arranged as mutually connected with the inlet port 15 of each solenoid valve coupled to the outlet 41 of another solenoid valve.

Figure 12:
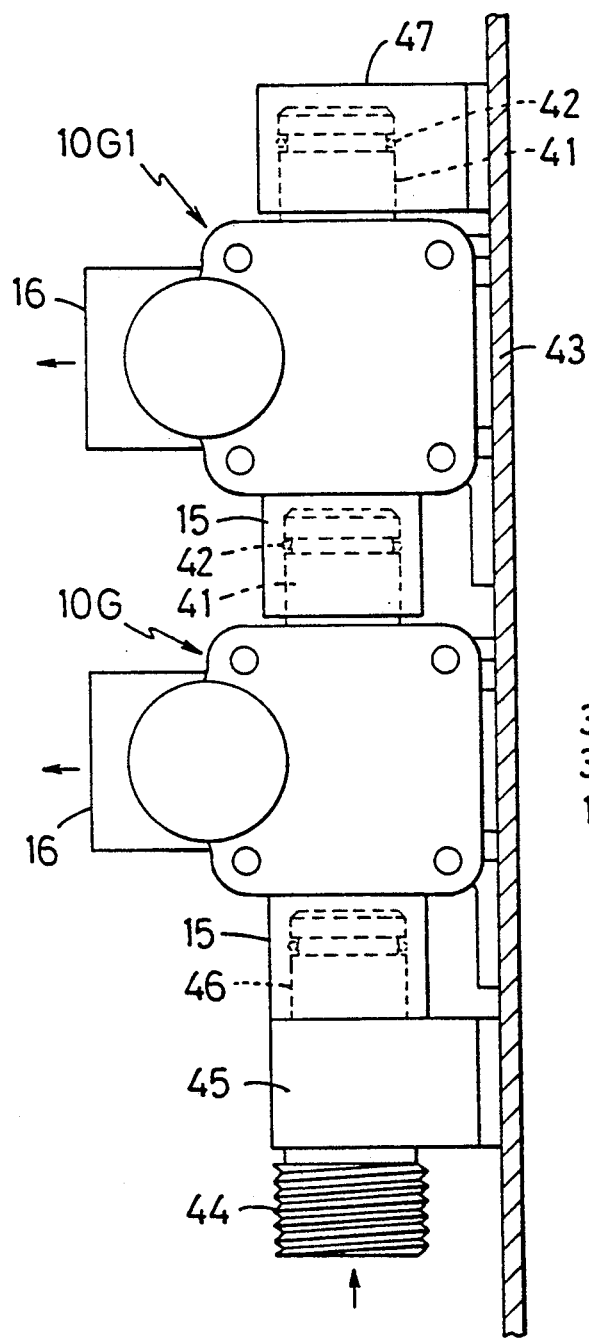
FIG. 12 shows in a plan view a state in which two of the solenoid valves shown in FIG. 10 are jointly coupled.

In FIG. 12, there is shown an aspect in which two of the solenoid valves 10G and 10G1 of the above embodiment of FIGS. 10 and 11 are connected to each other, in which the solenoid valves 10G and 10G1 are mounted onto an optimum mounting plate 43 while coupling the supplied fluid outlet 41 of one solenoid valve 10G into the inlet port 15 of the other solenoid valve 10G1, whereby the fluid supply sides of the two valves are interconnected in series. To the inlet port 15 of the one solenoid valve 10G, a connecting joint 45 is connected at its supplied fluid outlet 46 liquid-tightly coupled through an O-ring, while this joint 45 is made connectable at its inlet port 44 peripherally threaded properly to a service fluid supply pipe (not shown), and the outlet 41 of the other solenoid valve 10G1 is closed by means of a cut-off plug 47 fitted over the outlet 41. Consequently, a fluid supplied from the service fluid supply pipe to the joint 45 and discharged out of its outlet 46 is caused to flow into both of the solenoid valves 10G and 10G1 which are mutually connected on their fluid supply side 13. Other constituents and their function, including the opening and closing operation of the both solenoid valves 10G and 10G1, are the same as those in the foregoing embodiments of FIGS. 1–3 and 7, and the same constituents as those in the embodiments are denoted by the same reference numerals.

What is claimed is:

1. A valve array comprising:
 a plurality of fluidly interconnected valves, each valve including:
  a valve housing forming a fluid supply passage, a fluid discharge passage, and a main valve seat defining a junction between said fluid supply and discharge passages, said fluid supply and discharge passages including an inlet port and a discharge port, respectively, said fluid supply passage also including an outlet,
  a main valve member biased for engagement with said main valve seat for closing said fluid supply passage from said fluid discharge passage, said fluid supply passage communicating with a first side of said main valve member,
  a first pressure chamber communicating with a second side of said main valve member disposed opposite said first side thereof,
  a fluid path communicating said first pressure chamber with said fluid supply passage and tending to equalize pressures on said first and second sides of said main valve member when said main valve member is in engagement with said main valve seat,
  a pilot chamber arranged in said housing in communication with said fluid discharge passage,
  a pilot valve seat disposed between said first pressure chamber and said pilot chamber, and
  pilot valve means arranged to open and close said pilot valve seat for opening and closing communication between said first pressure chamber and said fluid discharge passage, said pilot valve means comprising a solenoid-actuated plunger, and a pilot valve actuable by said plunger and arranged for opening and closing said pilot valve seat,
 successively arranged ones of said valves in said valve array being fluidly interconnected by having said outlet of one of said successively arranged valves connected to said inlet port of the other of sad successively arranged valves,
 a connecting joint connectible to a fluid supply pipe and to said fluid inlet port of an initial one of said valves in said array for supplying fluid to said valve array, and
 a cut-off plug closing said outlet of a last one of said valves in said valve array.

2. A fluid valve apparatus including at least one valve which comprises:
 a valve housing forming a main fluid path including fluid supply and discharge passages communicating with each other, and a main valve seat defining a junction for said communication between said fluid supply and discharge passages, said fluid supply and discharge passages including an inlet port and a discharge port, respectively,
 a main valve member normally in engagement with said main valve seat for closing communication between said fluid supply and discharge passages, said fluid supply passage being defined on a first side of said main valve member,
 a first pressure chamber defined on a second side of said main valve member disposed opposite said first side thereof,
 a first communication path communicating said first pressure chamber with said fluid supply passage for tending to equalize pressures on said first and second sides of said main valve member when said main valve member is in engagement with said main valve seat,
 a second communication path for communicating said first pressure chamber with said fluid discharge passage, said second communication path comprising a pilot chamber, and a pilot valve seat disposed between said pilot chamber on the one hand, and one of said fluid discharge passage and said first pressure chamber on the other hand,
 pilot valve means arranged to open and close said pilot valve seat for opening and closing said communication of said pilot chamber with said one of said fluid discharge passage and said first pressure chamber, said pilot valve means comprising:
  a pilot diaphragm valve defining on one side thereof said pilot chamber and a second pressure chamber on the other side thereof and arranged for opening and closing said pilot valve seat, said pilot diaphragm valve being engageable with said pilot valve seat for closing said pilot valve seat, such that said pilot chamber is closed to fluid pressure in said one of said fluid discharge passage and said first pressure chamber, and is open to fluid pressure in the other of said fluid discharge passage and said first pressure chamber,
  a third communication path for transmitting to said second pressure chamber the fluid pressure of said other of said fluid discharge passage and said first pressure chamber for tending to equalize fluid pressure in said pilot chamber and said second pressure chamber,
  a plunger arranged in said second pressure chamber and normally biased in a first direction for urging said pilot diaphragm valve into engagement with said pilot valve seat, and
  an electric solenoid coil arranged, upon being energized for urging said plunger at least to a shift position in a second direction opposite said first direction to thereby allow said opening of said pilot valve seat for breaking said equalized pressures on said first and second sides of said main valve member to enable said main fluid path to be opened.

3. A fluid valve apparatus according to claim 2, wherein said one of said fluid discharge passage and said first pressure chamber is the former.

4. A fluid valve apparatus according to claim 3, wherein said second pressure chamber communicates with fluid pressure in said first pressure chamber at a location upstream of said pilot chamber.

5. A fluid valve apparatus according to claim 2, wherein said one of said fluid discharge passage and said first pressure chamber is the latter.

6. A fluid valve apparatus according to claim 5, wherein said second pressure chamber communicates with fluid pressure in sid fluid discharge passage at a location downstream of said pilot chamber.

7. A fluid valve apparatus according to claim 2, wherein said solenoid coil is arranged for urging said plunger selectively in said first and second directions, said pilot valve means further comprises a permanent magnet for attracting said plunger to maintain the plunger at said shift position when said solenoid coil is de-energized, said solenoid coil being able to overcome the magnetic attraction of said permanent magnet when urging said plunger in said first direction.

8. A fluid valve apparatus according to claim 2, wherein aid pilot diaphragm valve is arranged such that a center portion thereof moves toward and away from said pilot valve seat relative to an outer periphery of said pilot diaphragm.

9. A fluid valve apparatus according to claim 8, wherein said plunger is fixedly attached to a side of said pilot diaphragm valve facing toward said second pressure chamber.

10. A fluid valve apparatus including a plurality of valves, each valve including:
- a valve housing forming fluid supply and discharge passages communicating with each other, and a main valve seat defining a junction for said communication between said fluid supply and discharge passages, said fluid supply and discharge passages including an inlet port and a discharge port, respectively, said fluid supply passage including an outlet disposed upstream of said main valve seat,
- a main vale member biased for engagement with said main valve seat for closing communication between said fluid supply and discharge passages, said fluid supply passage being define don a first side of said main valve member,
- a first pressure chamber defined on a second side of said main valve member disposed opposite said first side thereof,
- a first communication path communicating said first pressure chamber with said fluid supply passage for tending to equalize pressures on said first and second sides of said main valve member when said main valve member is in engagement with said main valve seat,
- a second communication path for communicating said first pressure chamber with said fluid discharge passage, said second communication path comprising a pilot chamber, and a pilot valve seat disposed between said pilot chamber on the one hand, and one of said fluid discharge passage and said first pressure chamber on the other hand,
- pilot valve means arranged to open and close said pilot vale seat for opening and closing said communication of said pilot chamber with said one of said fluid discharge passage and said first pressure chamber, said pilot valve means comprising:
  - a solenoid-actuated plunger arranged in a second pressure chamber, and
  - a pilot diaphragm valve actuable by said plunger and defining on one side thereof said pilot chamber and a second pressure chamber on the other side thereof and arranged for opening and closing said pilot valve seat, said pilot diaphragm valve being in engagement with the pilot valve seat for said closing thereof, such that said pilot chamber is closed from fluid pressure in said one of said fluid discharge passage and said first pressure chamber and is open to fluid pressure in the other of said fluid discharge passage and said first pressure chamber,
- said valves being interconnected in series such that said outlet of one vale is connected to said fluid supply passage of the next valve by a connecting joint, and
- a cut-off plug fitted into said outlet of a last of said valves in said series.

* * * * *